US009087069B1

(12) United States Patent
Thiam et al.

(10) Patent No.: US 9,087,069 B1
(45) Date of Patent: Jul. 21, 2015

(54) SYSTEMS AND METHODS FOR DUPLICATING BACKUP IMAGES

(75) Inventors: Alioune Thiam, Hugo, MN (US);
Raman Sckhon, Blaine, MN (US)

(73) Assignee: Symantec Corporation, Mountain View, CA (US)

( * ) Notice: Subject to any disclaimer, the term of this patent is extended or adjusted under 35 U.S.C. 154(b) by 513 days.

(21) Appl. No.: 12/911,306

(22) Filed: Oct. 25, 2010

(51) Int. Cl.
*G06F 17/30* (2006.01)

(52) U.S. Cl.
CPC .... *G06F 17/30153* (2013.01); *G06F 17/30159* (2013.01)

(58) Field of Classification Search
CPC ............ G06F 17/30159; G06F 17/30153
See application file for complete search history.

(56) References Cited

U.S. PATENT DOCUMENTS

| 7,574,418 | B1 * | 8/2009 | Patterson et al. | 1/1 |
| 8,473,587 | B1 * | 6/2013 | Lappas et al. | 709/220 |
| 2001/0034737 | A1 * | 10/2001 | Cane et al. | 707/204 |
| 2003/0028723 | A1 * | 2/2003 | Segev et al. | 711/113 |
| 2003/0126247 | A1 * | 7/2003 | Strasser et al. | 709/223 |
| 2005/0038836 | A1 * | 2/2005 | Wang | 707/204 |
| 2007/0198575 | A1 * | 8/2007 | Tabellion et al. | 707/102 |
| 2007/0294321 | A1 * | 12/2007 | Midgley et al. | 707/204 |
| 2008/0154928 | A1 * | 6/2008 | Bashyam et al. | 707/101 |
| 2008/0294611 | A1 * | 11/2008 | Anglin et al. | 707/3 |
| 2009/0307251 | A1 * | 12/2009 | Heller et al. | 707/101 |
| 2010/0250501 | A1 * | 9/2010 | Mandagere et al. | 707/692 |

OTHER PUBLICATIONS

Paul Massiglia;Block-Level Incremental Backup; Veritas;2000; pp. 1-13.*

* cited by examiner

*Primary Examiner* — Shew-Fen Lin
*Assistant Examiner* — Jermaine Mincey
(74) *Attorney, Agent, or Firm* — ALG Intellectual Property, LLC

(57) ABSTRACT

A computer-implemented method for duplicating backup images may include (1) identifying at least one storage device, (2) identifying a plurality of backup images to be duplicated to the storage device, (3) creating a composite image of the plurality of backup images, and then (4) storing the composite image on the storage device instead of duplicating the plurality of backup images to the storage device. Various other methods, systems, and computer-readable media are also disclosed.

20 Claims, 6 Drawing Sheets

SYSTEMS AND METHODS FOR DUPLICATING BACKUP IMAGES

BACKGROUND

In the digital age, organizations increasingly rely on digitally stored data. To protect against data loss, an organization may use a backup system to back up important data. To provide further protection, an organization may use a duplication system to create copies of a backup on additional storage tiers. For example, as backup images are created, a duplication system may create additional copies of the backup images on long-term storage devices.

Unfortunately, various constraints may slow the duplication process, potentially resulting in the duplication system failing to keep up with the rate at which backup images are created. For example, if the duplication system uses tape as a storage medium, the tape-based storage device may store duplicated backup images more slowly than the backup images are created. Some tape-based storage devices may operate at an average lower speed when periods of write activity are interrupted by inactivity. Furthermore, some tape-based storage devices may consume a large amount of time writing file marks at the end of each file (e.g., a couple of seconds for each file mark). As such, the instant disclosure identifies a need for additional and improved systems and methods for duplicating backup images.

SUMMARY

As will be described in greater detail below, the instant disclosure generally relates to systems and methods for duplicating backup images by creating a composite image of multiple backup images to copy in place of the backup images. In one example, a computing device may accomplish such a task by (1) identifying at least one storage device, (2) identifying a plurality of backup images to be duplicated to the storage device, (3) creating a composite image of the plurality of backup images, and then (4) storing the composite image on the storage device instead of duplicating the plurality of backup images to the storage device.

In some examples, the storage device may include a tape-based storage device. In these examples, when storing the composite image on the storage device, the systems described herein may write a single file mark at the end of the composite image to delimit the entire composite image.

The systems described herein may identify the plurality of backup images using a variety of criteria. For example, the systems described herein may be configured to identify a plurality of backup images stored on an intelligent storage device (e.g., capable of deduplication functions). In some examples, the systems described herein may be configured to identify a plurality of backup images including at least one backup image of a size below a predetermined threshold.

Creating the composite image may include deduplicating the plurality of backup images. In some examples, the composite image may include (1) a plurality of data blocks sufficient to reconstruct the plurality of backup images and (2) metadata for reconstructing the plurality of backup images from the composite image. Such metadata may include a block map.

As will be described in greater detail below, by creating and storing a composite image rather than individual backup images, the systems and methods described herein may store less data (e.g., because the composite image contains deduplicated data), thereby saving storage space and decreasing duplication time. Additionally, by storing a single composite image rather than individual backup images, the systems and methods described herein may increase write efficiency to a tape storage medium by performing more continuous writing and by reducing the number of tape marks used to delimit images stored on the tape.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
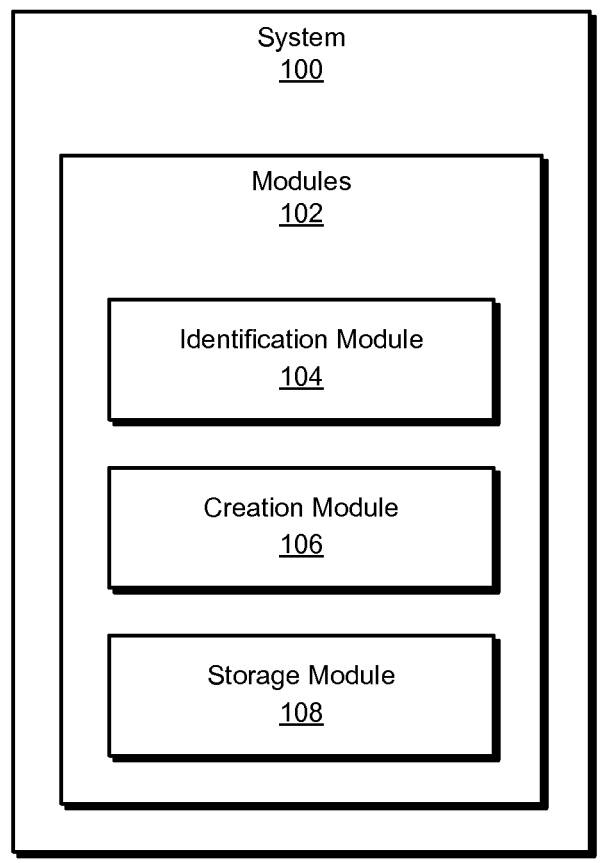
FIG. 1 is a block diagram of an exemplary system for duplicating backup images.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
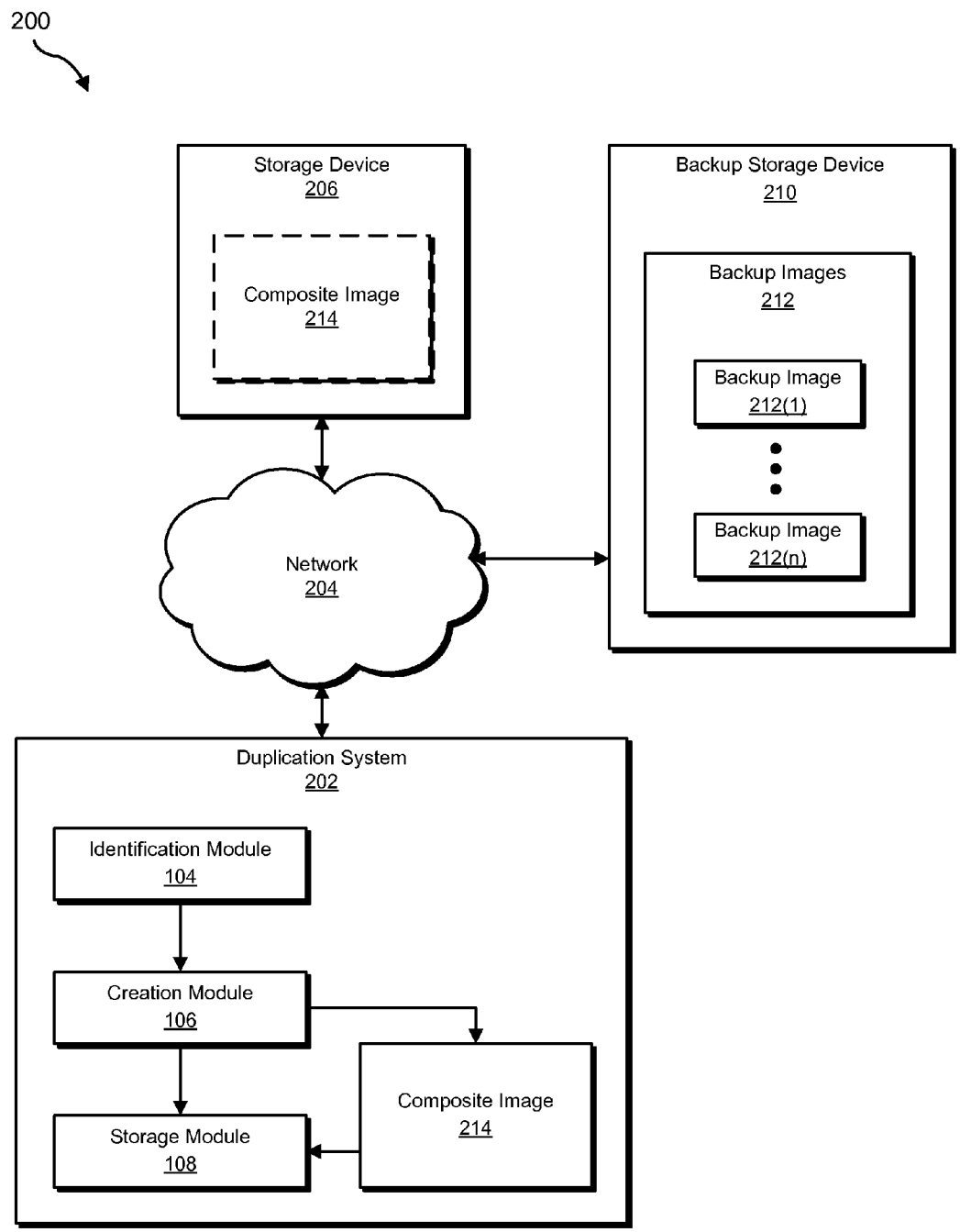
FIG. 2 is a block diagram of an exemplary system for duplicating backup images.

The following will provide, with reference to FIGS. 1-2, detailed descriptions of exemplary systems for duplicating backup images. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for duplicating backup images. As illustrated in this figure, exemplary system 100 may include one or more modules 102 for performing one or more tasks. For example, and as will be explained in greater detail below, exemplary system 100 may include an identification module 104 programmed to (1) identify at least one storage device and (2) identify a plurality of backup images to be duplicated to the storage device. Exemplary system 100 may also include a creation module 106 programmed to create a composite image of the plurality of backup images.

In addition, and as will be described in greater detail below, exemplary system 100 may include a storage module 108 programmed to store the composite image on the storage device instead of duplicating the plurality of backup images to the storage device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., duplication system 202, storage device 206, and/or backup storage device 210), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a duplication system 202 in communication with a storage device 206 via a network 204.

In one embodiment, and as will be described in greater detail below, modules 102 from FIG. 1 may program duplication system 202 to duplicate backup images by (1) identifying at least one storage device (e.g., storage device 206), (2) identifying a plurality of backup images (e.g., backup images 212 on a backup storage device 210) to be duplicated to the storage device, (3) creating a composite image of the plurality of backup images (e.g., a composite image 214), and then (4) storing the composite image on the storage device instead of duplicating the plurality of backup images to the storage device.

Duplication system 202 generally represents any type or form of computing device capable of reading computer-executable instructions. Examples of duplication system 202 include, without limitation, laptops, desktops, servers, data management appliances, cellular phones, personal digital assistants (PDAs), multimedia players, embedded systems, combinations of one or more of the same, exemplary computing system 510 in FIG. 5, or any other suitable computing device.

Storage device 206 generally represents any type or form of computing device that is capable of storing data. Examples of storage device 206 include, without limitation, tape drives, magneto-optical disc drives, holographic disc drives, and/or any other sequential-access or direct-access storage devices.

Backup storage device 210 generally represents any type or form of computing device that is capable of storing backup data. Examples of backup storage device 210 include hard disk drives and/or disk arrays.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between duplication system 202 and storage device 206.

Figure 3:
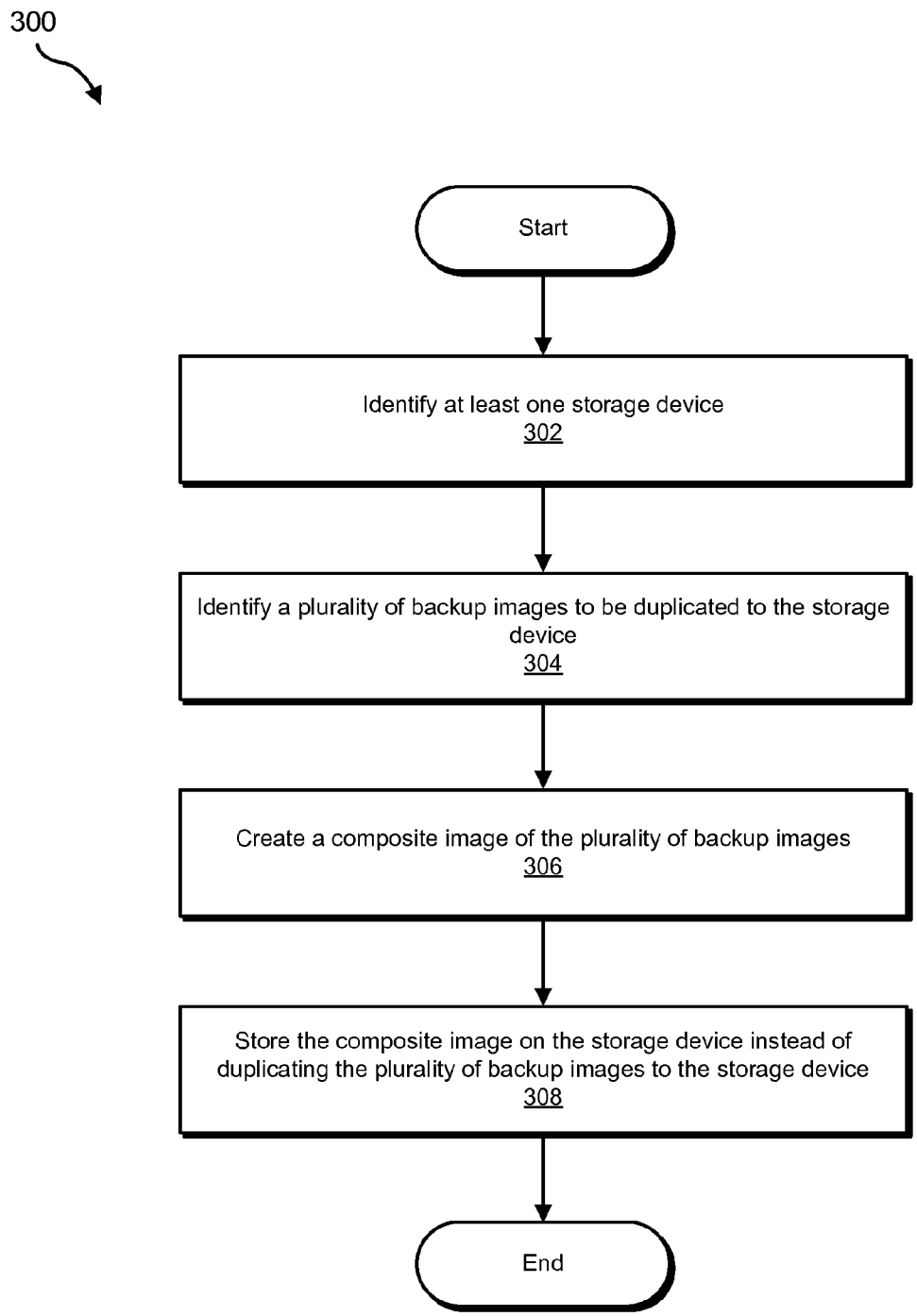
FIG. 3 is a flow diagram of an exemplary method for duplicating backup images.

FIG. 3 is a flow diagram of an exemplary computer-implemented method 300 for duplicating backup images. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify at least one storage device. For example, at step 302 identification module 104 may, as part of duplication system 202 in FIG. 2, identify storage device 206.

Identification module 104 may perform step 302 in any suitable manner. For example, identification module 104 may identify the storage device by reading from a configuration file identifying a target storage device for duplicated backup images.

In some examples, the storage device may include a tape-based storage device. Accordingly, the storage device may only provide sequential write access. Furthermore, the tape-based storage device may achieve a higher write throughput during long periods of continuous writing as opposed to short periods of continuous writing (e.g., the tape-based storage device may provide a fast-write mode for uninterrupted write streams that cannot be achieved instantaneously). Accordingly, by avoiding switching back and forth between reading backup images and writing backup images, the systems described herein may improve write throughput during duplication.

Figure 4:
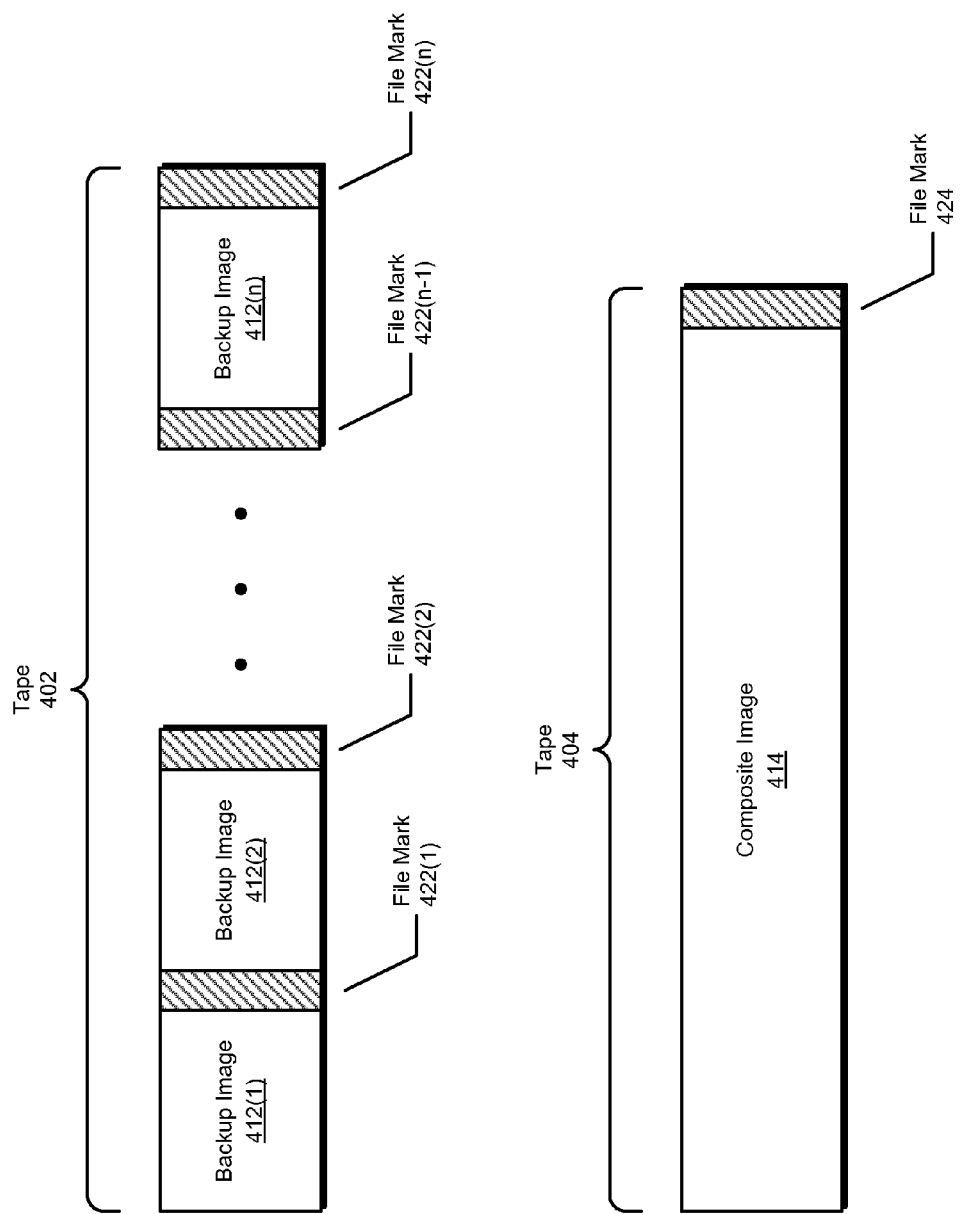
FIG. 4 is an illustration of exemplary tapes used for duplicating backup images.

FIG. 4 is an illustration of exemplary tapes 402 and 404 used for duplicating backup images. Tape 402 may represent a tape storing duplicated backup images using traditional technologies, whereas tape 404 may represent a tape storing duplicated backup images systems and methods described herein. As will be described in greater detail below, the tape-based storage device may use file marks to delimit files.

Returning to FIG. 3, at step 304 one or more of the systems described herein may identify a plurality of backup images to be duplicated to the storage device. For example, at step 304 identification module 104 may, as part of duplication system 202 in FIG. 2, identify backup images 212 to be duplicated to storage device 206.

Identification module 104 may perform step 304 in any suitable manner. For example, identification module 104 may be configured to monitor the storage location of the plurality of backup images (e.g., backup storage device 210 in FIG. 2) for new backup images. In some examples, identification module 104 may allow a predetermined number of new backup images (since, e.g., the last composite image created) to appear before identifying the plurality as such. In other examples, identification module 104 may identify include new backup images in the plurality of backup images until the storage device (e.g., storage device 206 in FIG. 2) is available for writing.

In some examples, the plurality of backup images may include at least one backup image of a size below a predetermined threshold. For example, identification module 104 may allow some backup images to be duplicated according to traditional technologies while reserving sufficiently small backup images to be duplicated according to the systems and methods described herein. Identification module 104 may accordingly include at least one small backup image in the plurality of backup images. In another example, identification module 104 may identify a plurality of backup images queued for duplication if the average size of the backup images in the plurality is below a predetermined threshold. In some examples, identification module 104 may apply the above-described criteria when the storage device is a tape-based storage device as described earlier. In this manner, identification module 104 may target small images that may otherwise create a large overhead during writes to the tape-based storage device.

The plurality of backup images may all be stored on the same storage device. In some examples, identification module 104 may identify a plurality of backup images stored on an intelligent storage device. For example, identification module 104 may identify the plurality of backup images because the backup images are stored together on the intelligent storage device.

As used herein, the phrase "intelligent storage device" may refer to an intelligent storage device, an advanced storage device, and/or a storage device with native capabilities such as data deduplication. An example of an intelligent storage device may include a SYMANTEC OPENSTORAGE TECHNOLOGY device. In addition, the term "deduplication" may refer to one or more operations related to reducing the amount of storage space used in a data storage system, including operations for detecting and preventing data from being redundantly stored to the same storage system. For example, data deduplication may reduce the amount of storage space used in a data storage system by detecting and removing redundant copies of data in the data storage system (and, e.g., replacing the redundant copies with references to a single copy).

As will be explained in greater detail below, in some examples the plurality of backup images may be deduplicated. Accordingly, the systems and methods described herein may use the native deduplication abilities of a backup storage device in the process of creating a composite image from the plurality of backup images.

At step 306, one or more of the systems described herein may create a composite image of the plurality of backup images. For example, at step 306 creation module 106 may, as part of duplication system 202 in FIG. 2, create composite image 214 of backup images 212. Using FIG. 4 as another example, creation module 106 may create a composite image 414.

Creation module 106 may perform step 306 in a variety of ways. For example, creation module 106 may simply append each backup image in the plurality of backup images to a single file. In some examples, the composite image may include a plurality of data blocks sufficient to reconstruct the plurality of backup images and metadata for reconstructing the plurality of backup images from the composite image. Creation module 106 may therefore create the composite image using data blocks from the plurality of backup images. In some examples, the metadata for reconstructing the plurality of backup images may include a block map. For example, each backup image in the plurality of backup images may be stored in the composite image as a series of references to data blocks stored elsewhere in the composite image.

In some examples, creation module 106 may create the composite image by deduplicating the plurality of backup images. For example, the composite image may only include unique data blocks across the plurality of backup images. In some examples, creation module 106 may perform the deduplication. In other examples, as described earlier, an intelligent storage device that stores the plurality of backup images may support native deduplication. In these examples, creation module 106 may retrieve deduplication information regarding the plurality of backup images from the intelligent storage device. Additionally or alternatively, creation module 106 may direct the intelligent storage device to deduplicate the plurality of backup images. Once the plurality of backup images are deduplicated, creation module 106 may store the deduplication information (e.g., the unique data blocks and a block map) in a single file (i.e., the composite image).

Returning to FIG. 3, at step 308 one or more of the systems described herein may store the composite image on the storage device instead of duplicating the plurality of backup images to the storage device. For example, at step 308 storage module 108 may, as part of duplication system 202 in FIG. 2, store composite image 214 on storage device 206 instead of duplicating backup images 212 to storage device 206. Using FIG. 4 as another example, storage module 108 may store composite image 414 on tape 404 rather than storing backup images 412(1)-(*n*) to a tape 402.

Storage module 108 may perform step 308 in any suitable manner. In some examples, storage module 108 may store the composite image to the storage device with a single write command and/or a continuous series of write commands. In addition, as explained earlier, the storage device may include a tape storage device. Accordingly, storage module 108 may, by storing the composite image as a single file, write only a single file mark at the end at the end of the composite image to delimit the entire composite image.

Using FIG. 4 as an example, tape 402 shows an exemplary result if the plurality of backup images had merely been directly duplicated to the tape storage device. After each backup image, the tape storage device may place a corresponding file mark (e.g., file marks 422(1)-(*n*) for backup images 412(1)-(*n*), respectively). Conversely, tape 404 shows composite image 414, requiring only a single file mark 424. Since the creation of a file mark may significantly delay a tape storage device (e.g., by a couple of seconds), by reducing the number of file marks, storage module 108 may greatly increase the efficiency of duplication, especially in cases in which the storage device poses a bottleneck. Upon completion of step 308, exemplary method 300 in FIG. 3 may terminate.

As explained above, by creating and storing a composite image rather than individual backup images, the systems and methods described herein may store less data (e.g., because the composite image contains deduplicated data), thereby saving storage space and decreasing duplication time. Additionally, by storing a single composite image rather than individual backup images, the systems and methods described herein may increase write efficiency to a tape storage medium by performing more continuous writing and by reducing the number of tape marks used to delimit images stored on the tape.

Figure 5:
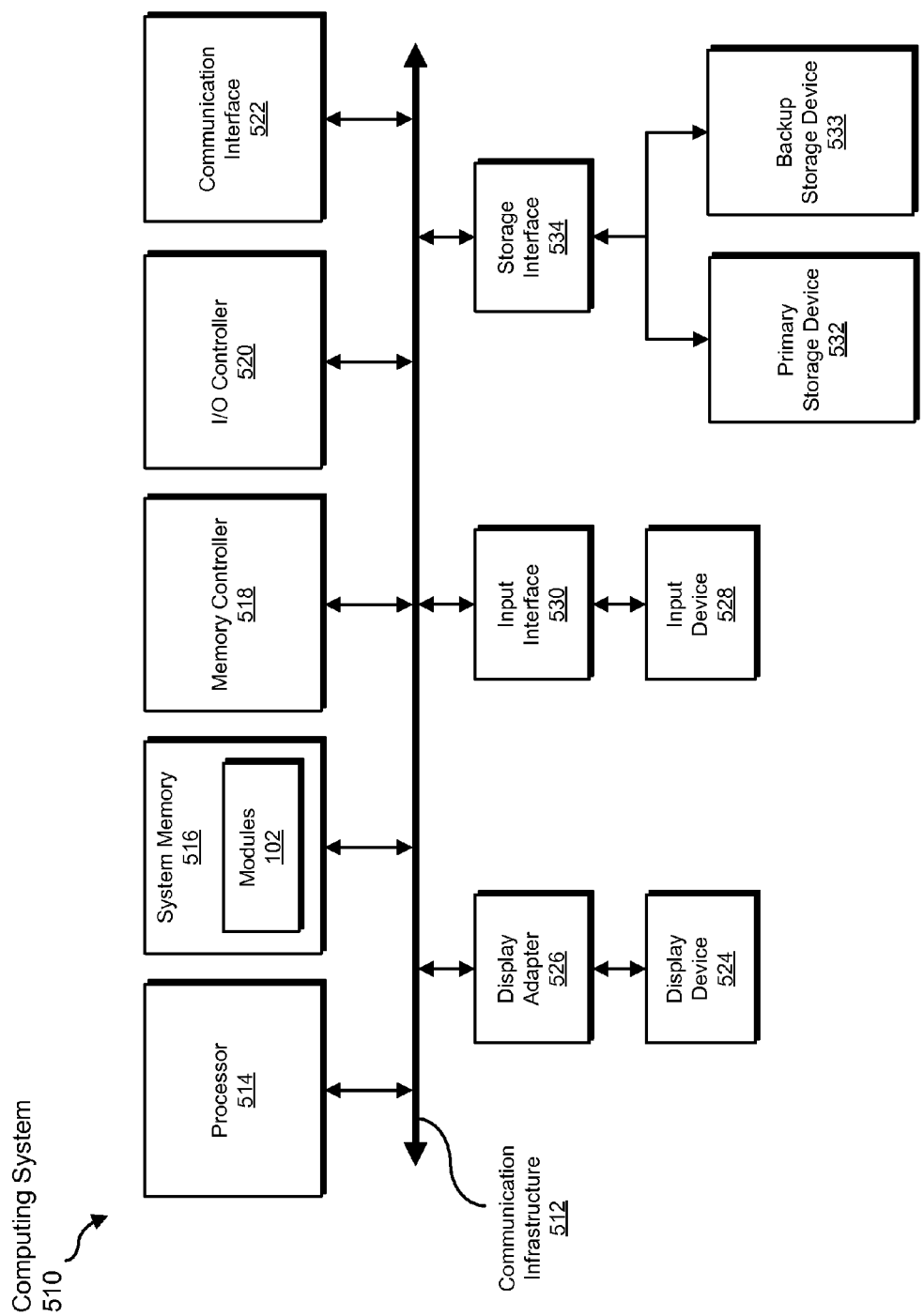
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, creating, storing, deduplicating, and/or writing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, creating, storing, deduplicating, and/or writing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, creating, storing, deduplicating, and/or writing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, creating, storing, deduplicating, and/or writing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, creating, storing, deduplicating, and/or writing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, creating, storing, deduplicating, and/or writing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
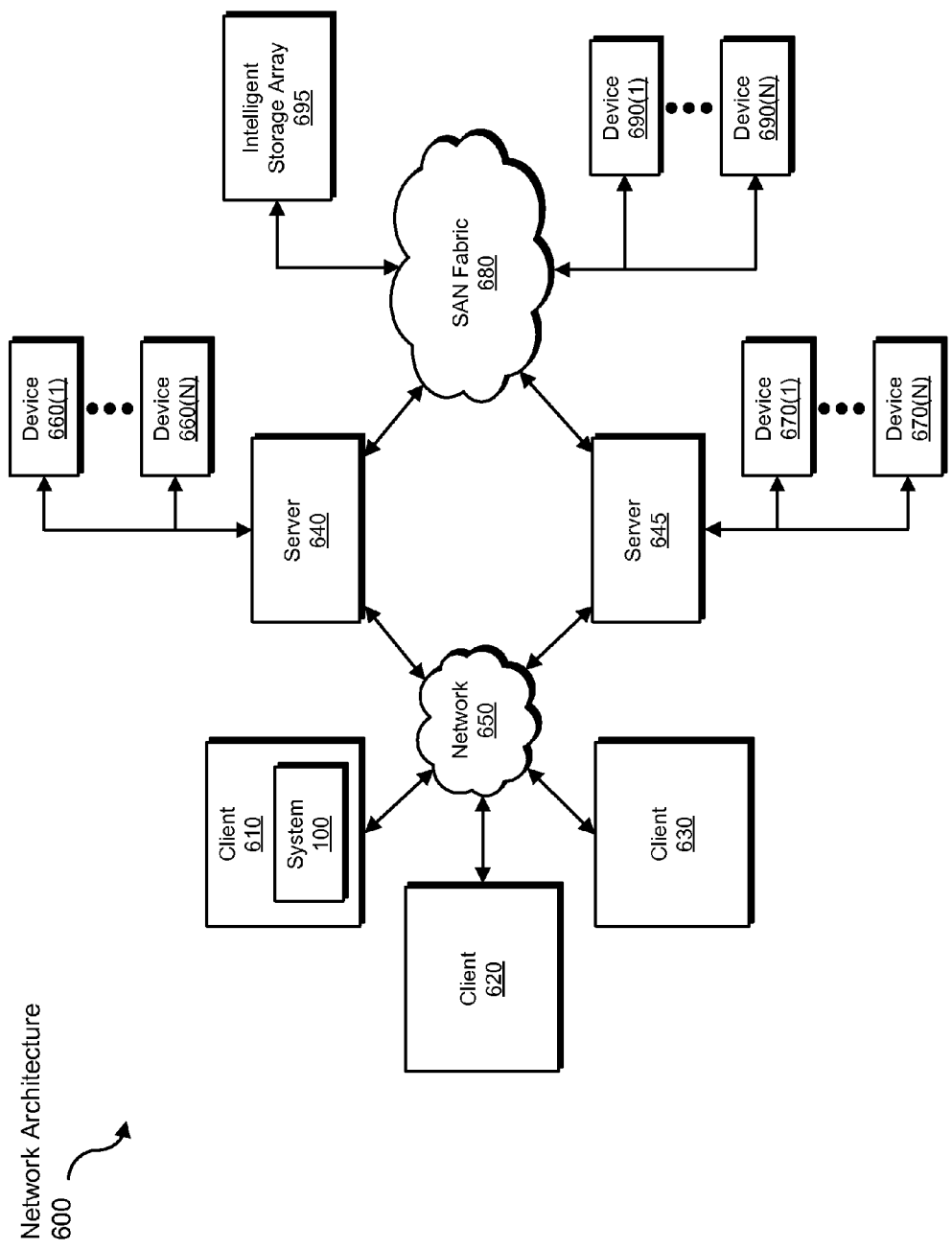
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, creating, storing, deduplicating, and/or writing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for duplicating backup images.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system for deduplication into a more efficient system for deduplication. As another example, one or more of the modules described herein may transform a plurality of backup images into a composite image.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for duplicating backup images, at least a portion of the method being performed by a computing device comprising at least one processor, the method comprising:
   identifying at least one storage device;
   identifying a predetermined size threshold for backup images that are to be duplicated to the storage device, wherein backup images that fall below the predetermined size threshold create unacceptable overhead when individually duplicated to the storage device;
   queuing a plurality of backup images to be duplicated to the storage device in a queue;
   determining that at least one of the backup images within the queue falls below the predetermined size threshold;
   in response to determining that at least one of the backup images within the queue falls below the predetermined size threshold, creating a composite image of the plurality of backup images, the composite image comprising a plurality of data blocks sufficient to reconstruct the plurality of backup images and metadata for reconstructing the plurality of backup images from the composite image, wherein:
      creating the composite image comprises deduplicating the plurality of backup images by detecting and removing redundant copies of data blocks within the plurality of data blocks so that the composite image includes unique data blocks across the plurality of backup images;
      the metadata comprises a block map that stores each backup image in the plurality of backup images being stored in the composite image as a series of references to data blocks within the plurality of data blocks;
   storing the composite image on the storage device instead of duplicating the plurality of backup images to the storage device.

2. The computer-implemented method of claim 1, wherein deduplicating the plurality of backup images comprises retrieving deduplication information from an intelligent storage device that stores the plurality of backup images.

3. The computer-implemented method of claim 1, wherein storing the composite image on the storage device comprises storing the composite image to the storage device with a single write command.

4. The computer-implemented method of claim 1, wherein storing the composite image on the storage device comprises
   storing the composite image to the storage device with a continuous series of write commands.

5. The computer-implemented method of claim 1, wherein the storage device comprises a tape-based storage device.

6. The computer-implemented method of claim 5, wherein storing the composite image on the storage device comprises writing a single file mark at the end of the composite image to delimit the entire composite image.

7. The computer-implemented method of claim 1, wherein the plurality of backup images are stored on an intelligent storage device.

8. The computer-implemented method of claim 1, further comprising:
   determining that the average size of the backup images within the queue falls below the predetermined size threshold, wherein the composite image of the plurality of backup images is only created in response to determining that the average size of the backup images within the queue falls below the predetermined size threshold.

9. A system for duplicating backup images, the system comprising:
   an identification module programmed to:
      identify at least one storage device;
      identify a predetermined size threshold for backup images that are to be duplicated to the storage device, wherein backup images that fall below the predetermined size threshold create unacceptable overhead when individually duplicated to the storage device;
      queue a plurality of backup images to be duplicated to the storage device in a queue;
      determine that at least one of the backup images within the queue falls below the predetermined size threshold;
   a creation module programmed to create, in response to the determination that at least one of the backup images within the queue falls below the predetermined size threshold, a composite image of the plurality of backup images, the composite image comprising a plurality of data blocks sufficient to reconstruct the plurality of backup images and metadata for reconstructing the plurality of backup images from the composite image, wherein:
      creating the composite image comprises deduplicating the plurality of backup images by detecting and removing redundant copies of data blocks within the plurality of data blocks so that the composite image includes unique data blocks across the plurality of backup images;
      the metadata comprises a block map that stores each backup image in the plurality of backup images being stored in the composite image as a series of references to data blocks within the plurality of data blocks;
   a storage module programmed to store the composite image on the storage device instead of duplicating the plurality of backup images to the storage device;
   at least one processor configured to execute the identification module, the creation module, and the storage module.

10. The system of claim 9, wherein the creation module is programmed to deduplicate the plurality of backup images by retrieving deduplication information from an intelligent storage device that stores the plurality of backup images.

11. The system of claim 9, wherein the storage module is programmed to store the composite image on the storage device by storing the composite image to the storage device with a single write command.

12. The system of claim 9, wherein the storage module is programmed to store the composite image on the storage device by
   storing the composite image to the storage device with a continuous series of write commands.

13. The system of claim 9, wherein the storage device comprises a tape-based storage device.

14. The system of claim 13, wherein the storage module is programmed to store the composite image on the storage device by writing a single file mark at the end of the composite image to delimit the entire composite image.

15. The system of claim 9, wherein the plurality of backup images are stored on an intelligent storage device.

16. The system of claim 9, wherein:
   the identification module is further programmed to determine that the average size of the backup images within the plurality of backup images falls below the predetermined size threshold;
   the creation module is further programmed to only create the composite image of the plurality of backup images in response to the determination that the average size of the backup images within the plurality of backup images falls below the predetermined size threshold.

17. A computer-readable-storage medium comprising one or more computer-executable instructions that, when executed by at least one processor of a computing device, cause the computing device to:
   identify at least one storage device;
   identify a predetermined size threshold for backup images that are to be duplicated to the storage device, wherein backup images that fall below the predetermined size threshold create unacceptable overhead when individually duplicated to the storage device;
   queue a plurality of backup images to be duplicated to the storage device in a queue;
   determine that at least one of the backup images within the queue falls below the predetermined size threshold;
   in response to determining that at least one of the backup images within the queue falls below the predetermined size threshold, create a composite image of the plurality of backup images, the composite image comprising a plurality of data blocks sufficient to reconstruct the plurality of backup images and metadata for reconstructing the plurality of backup images from the composite image, wherein:
      creating the composite image comprises deduplicating the plurality of backup images by detecting and removing redundant copies of data blocks within the plurality of data blocks so that the composite image includes unique data blocks across the plurality of backup images;
      the metadata comprises a block map that stores each backup image in the plurality of backup images being stored in the composite image as a series of references to data blocks within the plurality of data blocks;
   store the composite image on the storage device instead of duplicating the plurality of backup images to the storage device.

18. The computer-readable-storage medium of claim 17, wherein the one or more computer-executable instructions further cause the computing device to store the composite image on the storage device by storing the composite image to the storage device with a single write command.

19. The computer-readable-storage medium of claim 17, wherein the one or more computer-executable instructions cause the computing device to store the composite image on the storage device by storing the composite image to the storage device with a continuous series of write commands.

20. The computer-readable-storage medium of claim 17, wherein the storage device comprises a tape-based storage device.

* * * * *